United States Patent
Song et al.

(10) Patent No.: US 8,641,873 B2
(45) Date of Patent: Feb. 4, 2014

(54) METHOD FOR SYNTHESIZING NANO PARTICLES

(75) Inventors: Soon Mo Song, Suwon-si (KR); Hyo Sub Kim, Suwon-si (KR); Gun Woo Kim, Suwon-si (KR); Sang Hyuk Kim, Suwon-si (KR); Sang Hoon Kwon, Suwon-si (KR); Kang Heon Hur, Suwon-si (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/550,871

(22) Filed: Jul. 17, 2012

(65) Prior Publication Data

US 2012/0285817 A1 Nov. 15, 2012

Related U.S. Application Data

(62) Division of application No. 12/662,529, filed on Apr. 21, 2010.

(30) Foreign Application Priority Data

Feb. 1, 2010 (KR) .................. 10-2010-0009118

(51) Int. Cl.
*H05F 3/00* (2006.01)

(52) U.S. Cl.
USPC ........ 204/164; 422/186; 422/189.04; 75/346; 75/338; 977/773; 977/775; 977/855; 977/891; 977/900

(58) Field of Classification Search
USPC ........ 204/164; 422/186, 186.04; 75/346, 338; 977/773, 775, 855, 891, 900
See application file for complete search history.

(56) References Cited

U.S. PATENT DOCUMENTS

| 6,444,009 | B1 | 9/2002 | Liu et al. |
| 7,981,190 | B2 | 7/2011 | Nakamura et al. |
| 2005/0231916 | A1 | 10/2005 | Bahl et al. |
| 2008/0124482 | A1 | 5/2008 | Smiljanic et al. |
| 2008/0230209 | A1 | 9/2008 | Khalili et al. |
| 2008/0277270 | A1 | 11/2008 | Biberger et al. |

FOREIGN PATENT DOCUMENTS

| JP | 5-228363 | 9/1993 |
| JP | 7-138020 | 5/1995 |
| JP | 2002-336688 | 11/2002 |
| JP | 2002-346377 | 12/2002 |
| JP | 2005-104830 | 4/2005 |
| JP | 2005-218938 | 8/2005 |
| JP | 2005-529727 | 10/2005 |
| JP | 2006-55839 | 3/2006 |
| JP | 2012-501094 | 1/2012 |
| KR | 10-2006-0118818 | 11/2006 |

OTHER PUBLICATIONS

U.S. Patent Office Action mailed Aug. 2, 2012 in corresponding U.S. Appl. No. 12/662,529.
U.S. Patent Restriction Requirement mailed Jun. 8, 2012 in corresponding U.S. Appl. No. 12/662,529.
U.S. Appl. No. 12/662,529, filed Apr. 21, 2010, Soon Mo Song et al, Samsung Electro-Mechanics Co., Ltd.
Office Action in parent U.S. Appl. No. 12/662,529 issued Jan. 10, 2013.

*Primary Examiner* — Xiuyu Tai

(57) ABSTRACT

A method for synthesizing nano particles, including: moving material in a plasma generating space in a first direction; and synthesizing nano particles by cooling the material moved along the first direction, wherein the synthesizing the nano particles may be performed by cooling the material at gradually lower temperatures during the moving thereof in the first direction.

6 Claims, 2 Drawing Sheets

METHOD FOR SYNTHESIZING NANO PARTICLES

CROSS-REFERENCE TO RELATED APPLICATIONS

This application is a U.S. divisional application filed under 37 CFR 1.53(b) claiming priority benefit of U.S. Ser. No. 12/662,529 filed in the United States on Apr. 21, 2010, which claims earlier priority benefit to Korean Patent Application No. 10-2010-0009118 filed with the Korean Intellectual Property Office on Feb. 1, 2010, the disclosures of which are incorporated herein by reference.

BACKGROUND

1. Field

The present invention relates to an apparatus for synthesizing nano particles and a method for synthesizing the nano particles using the same, and more particularly, to an apparatus for effectively synthesizing nano particles having a relatively large size and a method for synthesizing the nano particles using the same.

2. Description of the Related Art

Recently, a high temperature plasma technology has been adopted for synthesizing ceramic or metal powders. For example, nano particles used as a material for a ceramic substrate such as a low temperature co-fired ceramic (LTCC), a high temperature co-fired ceramic (HTCC), etc. can be synthesized by a mechanical grinding method, a sol-gel method, a spray pyrolysis, a combustion synthesis, and a high temperature plasma synthesis. However, recently, other syntheses have gradually been replaced by the high temperature plasma synthesis.

A nano particle synthesis technology using a general high temperature plasma technology exposes precursors to a high temperature atmosphere generated due to an induced electric field and dielectric breakdown of gas and then passes the precursors vaporized by the high temperature atmosphere through the gas flow having a relatively low temperature. Therefore, the precursors are rapidly cooled, thereby synthesizing nano particles in powder form.

However, the nano particle synthesis technology using the high temperature plasma described above has a limitation in forming nano particles having a large size. For example, the manner to rapidly cool the vaporized precursors leads to a relatively short period of a reaction time taken in synthesizing nano particles having a sufficient size, thereby having a difficulty in forming nano particles having a large size. In particular, a high temperature plasma synthesis apparatus currently used has a difficulty in stably forming spherical nano particles having a diameter of 100 nm or more due to technical limitations.

Further, with the nano particle synthesis technology using the general high temperature plasma, the synthesized nano particles are deposited on the inner walls of the synthesis apparatus, thereby causing a phenomenon that the inside of the apparatus is polluted. The pollution phenomenon of the apparatus described above is concentrated on a period where the precursors are rapidly cooled. If the pollution of the apparatus is accumulated, synthesis efficiency of the nano particles is deteriorated.

SUMMARY

The present invention has been made in an effort to provide an apparatus for effectively synthesizing nano particles having a large size and a method for synthesizing the nano particles using the same. For example, one object of the present invention is to provide an apparatus for stably synthesizing nano particles having a diameter of at least 100 nm or more and a method for synthesizing the nano particles using the same.

The present invention has been also made in an effort to provide an apparatus for synthesizing nano particles that prevents the inside of the apparatus from being polluted as the synthesized nano particles are deposited at the inner walls of the apparatus during the synthesizing process of the nano particles, and a method for synthesizing the nano particles using the same.

An exemplary embodiment of the present invention provides an apparatus for synthesizing nano particles including: a plasma generator that generates plasma; a recovery device that recovers the synthesized nano particles; and a cooler that is disposed between the plasma generator and the recovery device and includes a cooling path where the nano particles are synthesized, while material supplied from the plasma generator is cooled, wherein the cooling path is set to have lower cooling temperatures for each section as going to the moving direction of the nano particles.

The cross-section of the cooling path may be increased as going to the moving direction of the nano particles.

The cooler may include a ceramic tube having a structure where the cross-section thereof is increased as going to the moving direction of the nano particles.

The cooler may include ring-shaped cooling plates stacked along the moving direction of the nano particles, and the cooling plates may be provided to have larger central opening diameters as going to the moving direction of the nano particles.

Injection holes of which injection angle is controlled so that cooling gas is injected to the inner walls of the cooling path may be provided between the cooling plates and the cooler may include: a first cooing gas supply line that supplies first cooling gas to the injection holes which are relatively close to the plasma generator among the injection holes; and a second cooling gas supply line that supplies second cooling gas having a lower temperature than the first cooling gas to the injection holes which are relatively far from the plasma generator among the injection holes.

The apparatus for synthesizing nano particles may further include a deceleration gas supplier that is disposed on the opposite side of the plasma generator based on the cooler and injects gas to the cooling path in a direction opposite to the moving direction of the nano particles.

The plasma generator, the cooler, and the deceleration gas supplier may be disposed on the same line in a row, and the recovery device may be disposed at one side of the cooler.

Another embodiment of the present invention provides an apparatus for synthesizing nano particles including: a synthesizing part that passes precursors through a plasma generating space where an plasma atmosphere is made to synthesize nano particles; and a recovering part that recovers the synthesized nano particles, wherein the synthesizing part includes: a plasma generator that has the plasma generating space; a cooler that has a cooling path where the nano particles are synthesized; and a deceleration gas supplier that supplies deceleration gas for decelerating the moving velocity of the nano particles to the cooling path, and the recovering part includes: a recovery pipe that is connected to the side walls of the cooler; and a recovery chamber that is connected to the recovery pipe, wherein the plasma generator, the cooler, and the gas supplier are sequentially disposed along a first line, and the recovery pipe is disposed at one side of the cooler along a second line perpendicular to the first line.

The cooling path may have lower cooling temperatures as going to the deceleration gas supplier.

The cross-section of the cooling path may be increased as going to the deceleration gas supplier.

The cooler may include: a first cooler that is disposed to be close to the plasma generator and a second cooler that is disposed to be far from the plasma generator compared to the first cooler, wherein the cooling temperature of the first cooler may be higher than the cooling temperature of the second cooler.

The cooler may include: a first cooler that is disposed to be close to the plasma generator and a second cooler that is disposed to be far from the plasma generator compared to the first cooler, wherein the cooling path in the first cooler may have a smaller cross-section than the cooling path in the second cooler.

Yet another embodiment of the present invention provides a method for synthesizing nano particles including: moving material in a plasma generating space in a first direction; synthesizing nano particles by cooling the material moved along the first direction; and recovering the synthesized nano particles, wherein the synthesizing the nano particles may be performed by cooling the material at gradually lower temperatures during the moving thereof in the first direction.

The synthesizing the nano particles may further include decelerating the moving velocity of the material.

The decelerating the moving velocity of the material may be performed by injecting cooling gas to the nano particles moved in the first direction in a second direction opposite to the first direction.

The decelerating the moving velocity of the material may be performed by increasing the cross-section of the cooling path where the nano particles are synthesized as going to the first direction.

The synthesizing the nano particles may further include injecting cooling gas to the inner walls of the cooing path where the nano particles are synthesized along the first direction.

The recovering the nano particles may be performed after changing the moving direction of the nano particles moved in the cooling path in the first direction to a third direction perpendicular to the first direction.

Yet another embodiment of the present invention provides a method for synthesizing nano particles including: forming nano particles by cooling precursors while the precursors are moved in a plasma generating space where a plasma atmosphere is made in a first direction, the cooling of the precursors being made at gradually lower temperatures as going to the first direction.

The cooling the precursors may further include decelerating the moving velocity of the precursors, wherein the decelerating the moving velocity of the precursors may be performed by supplying inert gas to the precursors in a second direction opposite to the first direction.

The cooling the precursors may further include decelerating the moving velocity of the precursors, wherein the decelerating the moving velocity of the precursors may be performed by increasing the cross-section of the cooling path where the nano particles are synthesized as going to the first direction.

The cooling the precursors may be performed by supplying cooling gas having lower temperatures as going to the first direction to the inside of the cooling path where the nano particles are synthesized.

DESCRIPTION OF EMBODIMENTS

Figure 1:
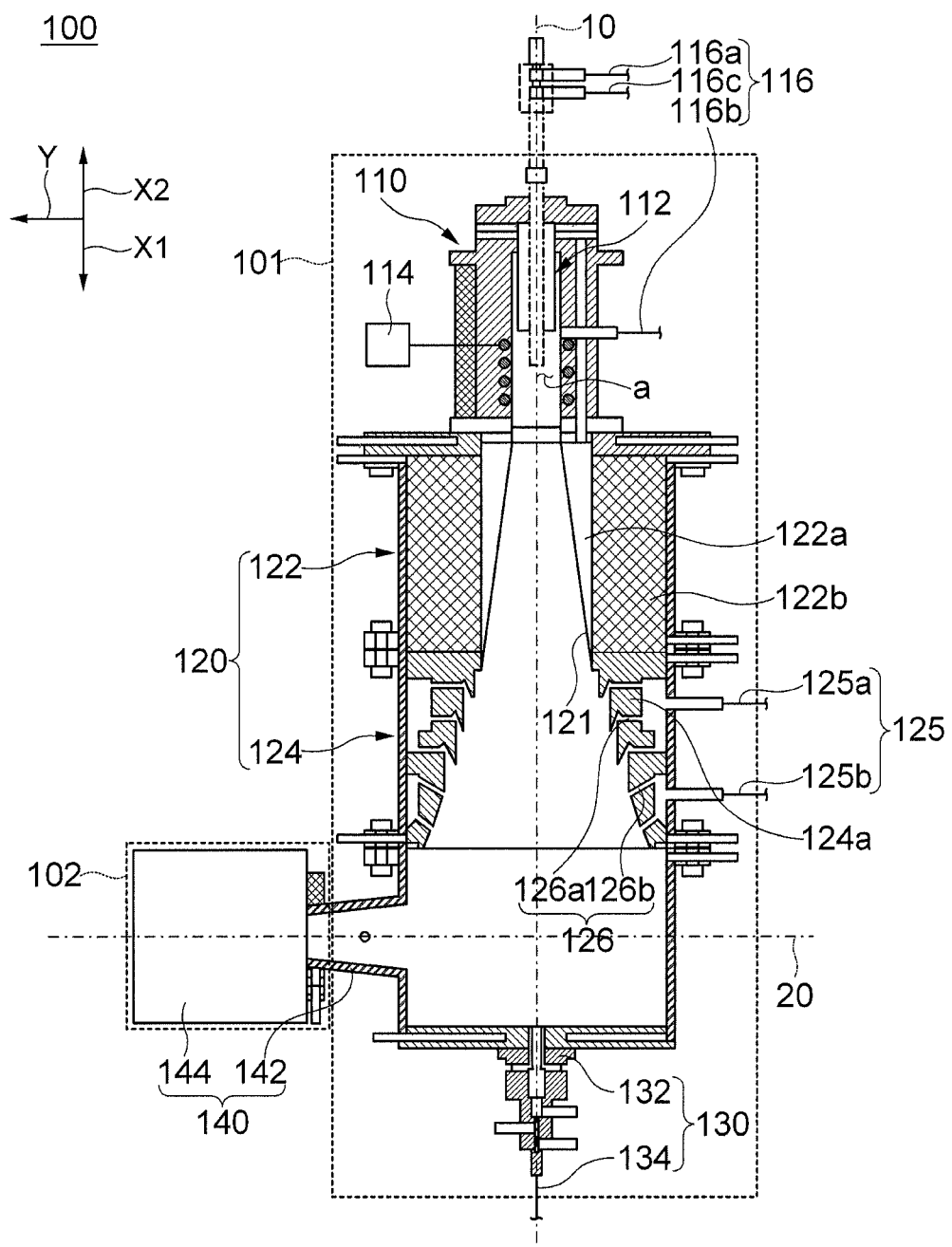
FIG. 1 is a diagram showing an apparatus for synthesizing nano particles according to an embodiment of the present invention.

Various advantages and features of the present invention and methods accomplishing thereof will become apparent from the following description of embodiments with reference to the accompanying drawings. However, the present invention may be modified in many different forms and it should not be limited to the embodiments set forth herein. Rather, these embodiments are provided so that this disclosure will be thorough and complete, and will fully convey the scope of the invention to those skilled in the art. Like reference numerals denote like elements throughout the specification.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Hereinafter, an apparatus for synthesizing nano particles and a method for synthesizing the nano particles using the same according to exemplary embodiments of the present invention will be described in detail with reference to the accompanying drawings.

Figure 2:
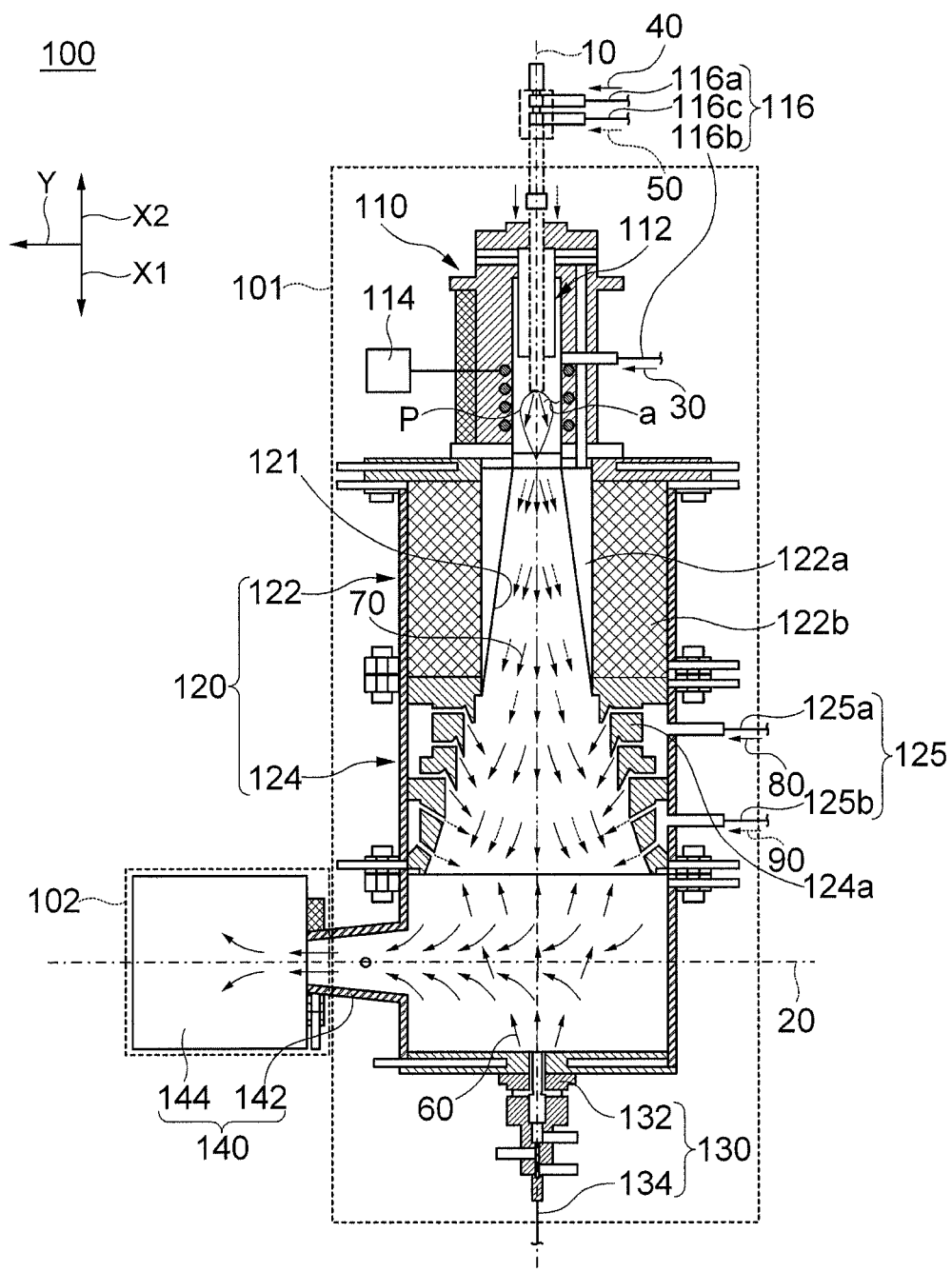
FIG. 2 is a diagram showing a process for synthesizing nano particles according to an embodiment of the present invention.

FIG. 1 is a diagram showing an apparatus for synthesizing nano particles according to an embodiment of the present invention, and FIG. 2 is a diagram showing a process for synthesizing nano particles of the apparatus for synthesizing nano particles of FIG. 1.

Referring to FIG. 1, an apparatus 100 for synthesizing nano particles according to an exemplary embodiment of the present invention may be configured to include a synthesizing part 101 and a recovering part 102. The synthesizing part 101 may include a plasma generator 110, a cooler 120, and a deceleration gas supplier 130, and the recovering part 102 may include a recovery device 140. The plasma generator 110, the cooler 120, and the deceleration gas supplier 130 may be arranged on a first line 10 in a row. To the contrary, the recovery device 140 may be arranged on a second line 20 perpendicular to the first line 10 from one side of the cooler 120. Therefore, the components 110, 120, 130, and 140 of the apparatus 100 for synthesizing the nano particles may generally be formed in an 'L'-letter or a 'T'-letter. Herein, the first line 10 is a perpendicular line that runs up and down, such that the plasma generator 110, the cooler 120, and the deceleration gas supplier 130 may be vertically arranged.

The plasma generator 110 may provide a plasma generating space a that forms a high temperature plasma atmosphere at the time of synthesizing the nano particles. For example, the plasma generator 110 may include a plasma torch 112, a power supply 114, and a supply line 116. The plasma torch 112 may be configured to generate plasma flame in the plasma generating space a. The power supply 114 may be a high frequency power supply. As another example, the power supply 114 may also be a DC power supply. The fluid supply line 116 can supply various sorts of fluids to the plasma generating space a. For example, the fluid supply line 116 may include a material supply line 116a, a central gas supply line 116b, and a carrier gas supply line 116c. In addition, the fluid supply line 116 may further include a sheath gas supply line (not shown) that supplies sheath gas preventing the material from being deposited on the inner walls of the apparatus 100.

The cooler 120 can cool the material moved from the plasma generator 110. For example, the cooler 120 may include a first cooler 122 and a second cooler 124. The first cooler 122 and the second cooler 124 may have a cooling path 121 through which the fluid moves inside thereof. The cooling path 121 may have a longitudinal direction parallel to the first line 10. The cooling path 121 may be a space where the material moves in the first direction X1 and further be a space where the material is cooled and the nano particles are synthesized.

The first cooler 122 may be disposed to be close to the plasma generator 110 compared to the second cooler 124. The first cooler 122 may include a ceramic tube 122a and a ceramic insulator 122b that surrounds the ceramic tube 122a. The second cooler 124 may include a plurality of cooling plates 124a. Each of the cooling plates 124a may have a ring shape where the center thereof is opened. In addition, the cooling plates 124a may have a structure where they are stacked in the first direction X1, for example, an up and down direction. Injection holes 126 that inject predetermined cooling gas may be provided between the cooling plates 124a. The injection holes 126 can inject the cooling gas supplied from the cooling gas supply line 125 to the inside of the cooling path 121. Herein, the injection angle of the injection holes 126 can be controlled so that the cooling gas is injected to the inner walls of the cooling path 121. Therefore, the cooling gas can prevent the nano particles synthesized within the cooling path 121 during the synthesizing process of the nano particles from being deposited on the inner walls of the cooling path 121.

Meanwhile, the first cooler 122 and the second cooler 124 may be set to have different cooling temperature. For example, the first cooler 122 may be set to have a higher cooling temperature than the second cooler 124. In addition, each of the first and second coolers 122 and 124 may also be constituted to be cooled at lower cooling temperatures for each section as going to the first direction X1, For example, the ceramic tube 122a of the first cooler 122 may be set to have lower cooling temperature for each section as going to the first direction X1, To this end, the first cooler 122 may include a plurality of ceramic heaters and in this case, it may be constituted so that the ceramic heaters set to have a low heating temperature as going to the first direction X1 are arranged. Further, the second cooler 124 may be constituted so that the cooling gas set to have a low cooling temperature as going to the first direction X1 is injected. For example, the injection holes 124b are vertically provided in plural, wherein the injection holes 124b may be disposed to inject the cooling gas at lower temperatures as going to the first direction X1. To this end, the cooling gas supply line 125 includes a first cooling gas supply line 125a that supplies the cooling gas to first injection holes 126a disposed at a relatively higher position and a second cooling gas supply line 125b that supplies the cooling gas to second injection holes 126b disposed at a lower position than the first injection holes 126a, wherein the first cooling gas supply line 125a can supply the cooling gas having a higher temperature than the second cooling gas supply line 125b.

Further, the first cooler 122 and the second cooler 124 may be constituted so that the cross-section of the cooling path 121 is increased as going to the first direction X1. To this end, the ceramic tube 122a of the first cooler 122 may be constituted so that the cross-section thereof is increased as going to the first direction X1. Moreover, the cooling plates 124a having different opening diameters are constituted to be vertically stacked, wherein the cooling plates 124a having a larger opening diameter as going to the first direction X1 are disposed. Therefore, any one of the first cooler 122 and the second cooler 124 may constitute the cooling path 121 having a structure where the cross-section thereof is increased as going to the first direction.

The deceleration gas supplier 130 can supply gas (herein, deceleration gas) that reduces moving velocity of the material and the nano particles to the cooling path 121. For example, the deceleration gas supplier 130 may include a supply port 132 and a deceleration gas supply line 134 connected to the supply port 132. The supply port 132 may be disposed on the opposite side of the plasma generator 110 based on the cooler 120. Therefore, the deceleration gas supplied from the deceleration gas supply line 134 can be injected to the cooling path 121 in a second direction X2 opposite to the first direction X1 by the supply port 132.

The recovery device 140 can recover the synthesized nano particles. For example, the recovery device 140 may include a recovery pipe 142 and a recovery chamber 144 connected to the recovery pipe 142. One end of the recovery pipe 142 may be connected to the side wall of the cooler 120 and the other end thereof may be connected to the recovery chamber 144. The recovery chamber 144 may generally be disposed at one side of the cooler 120. Therefore, the nano particles that moves within the cooler 120 in the first direction X1 can be recovered into the recovery chamber 144 by the recovery pipe 142 after the moving direction thereof is changed into a third direction Y perpendicular to the first direction X1.

As described above, the apparatus 100 for synthesizing nano particles according an exemplary embodiment of the present invention includes the cooler 120 that cools the material for synthesizing the nano particles, wherein the cooler 120 may have the first and second coolers 122 and 124 that are constituted having a lower cooling temperature for each section as going to the moving direction of the material. Therefore, the apparatus 100 for synthesizing nano particles according an exemplary embodiment of the present invention may have a structure where the cooling temperature of the material becomes gradually lower as going to the first direction X1 at the time of synthesizing the nano particles to prevent the material from being quickly frozen.

The apparatus 100 for synthesizing nano particles according an exemplary embodiment of the present invention may include the first and second coolers 122 and 124 having a structure where the cross-section thereof is increased as going to the first direction X1. Therefore, the moving velocity of the nano particles is decelerated during the moving process in the cooler 120, such that the apparatus 100 for synthesizing nano particles 100 can have a structure to increase the residence time of the material within the cooling path 121.

Further, the apparatus 100 for synthesizing nano particles according an exemplary embodiment of the present invention may include the deceleration gas supplier 130 that supplies the deceleration gas to the cooler 120 in the second direction X2 opposite to the moving direction of the nano particles. Therefore, the apparatus 100 for synthesizing nano particles can have a structure to increase the residence time of the material within the cooling path 121 by decreasing the moving velocity of the nano particles that move within the cooler 120 at the time of synthesizing the nano particles.

Continuously, a method for synthesizing nano particles using an apparatus 100 for synthesizing nano particles having the structure as described above will be described in detail. Herein, the overlapped description of the apparatus 100 for synthesizing nano particles as described above may be omitted or simplified.

Referring to FIGS. 1 and 2, the power supply 116 can apply a predetermined high frequency power to the plasma torch 112. And, the central gas supply line 116*b* of the fluid supply line 116 can supply central gas 30 to the plasma generating space a. As for the central gas 30, argon (Ar) gas may be used. The central gas 30 is activated by the plasma torch 112, such that plasma flame P can be generated in the plasma generating space a. And, the material supply line 116*a* and the carrier gas supply line 116*c* of the fluid supply line 116 can supply material 40 and carrier gas 50 to the plasma generating space a, respectively, through the plasma torch 112. The material 40 may be precursors of the nano particles 70 to be synthesized. The material 40 can effectively move in the cooling path 121 of the cooler 120 in the first direction X1 by the carrier gas 50. Further, the deceleration gas supply line 134 of the deceleration gas supplier 130 can supply deceleration gas 60 to the supply port 132. The deceleration gas 60 supplied through the supply port 132 can move in the cooling path 121 in the second direction X2.

The material 40 is cooled, in order, by the first and second coolers 122 and 124 during the moving process in the cooling path 121 of the cooler 120, such that the material can be synthesized into the nano particles 70. Herein, the first and second coolers 122 and 124 can cool the cool path 121 at lower cooling temperatures for each section as going to the first direction X1, For example, the ceramic tube 122*a* of the first cooler 122 may be constituted so that the cooling temperature thereof lowers as going to the first direction X1. Further, the first cooling gas supply line 125*a* of the second cooler 124 can supply first cooling gas 80 to the first injection holes 126*a* disposed at a relatively higher position and the second cooling gas supply line 125*b* thereof can supply second cooling gas 90 having a lower temperature than the first cooling gas 80 to the second injection holes 126*b*. Therefore, the material 40 can be cooled at gradually lower temperatures for each section during the moving process in the cooling path 121. Therefore, the probability of the material 40 to be synthesized into the nano particles 70 having a larger size is increased by preventing the material 40 from being quickly frozen in the cooling path 121, such that the nano particles 70 having a large size can be synthesized.

Further, the cooling path 121 may be provided in a structure where the cross-section thereof is increased as going to the first direction X1. In this case, the moving velocity of the material 40 can be decelerated during the moving process in the cooling path 121. In addition, the deceleration of the moving velocity of the material 40 can also be made by the deceleration gas 60 as described above. As described above, the moving velocity of the material 40 that moves in the cooling path 121 is decelerated to increase the residence time of the material 40 in the cooling path 121, thereby making it possible to increase the probability to be synthesized into the nano particles 70 having a larger size. The synthesized nano particle 70 is generally formed in power form, wherein it may have a spherical shape. At this time, the nano particle 70 synthesized in the manner as described above may have a diameter of at least 100 nm or more.

The nano particles 70 can be discharged from the synthesizing part 101 and be introduced into the recovering part 102 through the recovery pipe 142. Herein, the recovering part 102 is disposed at one side of the cooler 120 of the synthesizing part 101, such that the nano particles 70 can be recovered into the recovery chamber 144 after the moving direction thereof is changed into a third direction Y generally perpendicular to the first direction X1. In this case, the moving velocity of the material 40 can be decelerated compared to the case where the recovering part 102 and the synthesizing part 101 are disposed in a row along the first line 10, such that the material 40 can be synthesized into the nano particles 70 having a larger size.

Meanwhile, as described above, the apparatus 100 for synthesizing nano particles prevents the material 40 from being quickly frozen in the cooling path 121, thereby making it possible to prevent the material 40 from being deposited on the inner walls of the cooling path 121. For example, there may be generated a phenomenon that the internal constitution of the apparatus 10 is polluted by the material 40. Such a pollution phenomenon may be concentrated on the region where the material 40 is quickly frozen. However, as described above, the present invention prevents the material 40 from being quickly frozen in the cooling path 121, thereby making it possible to the inner walls of the cooling path 121 from being polluted.

As described above, the method for synthesizing the nano particles using the apparatus 100 for synthesizing nano particles according to an exemplary embodiment of the present invention gradually cools the material 40 during the moving process of the material 40 along the cooling path 121 where the nano particles 70 are synthesized, such that the material 40 can be prevented from being quickly frozen. Therefore, the method for synthesizing the nano particles according to the present invention allows the time consuming in synthesizing the material 40 in the cooling path 121 to be sufficient, such that the material 40 can be synthesized into the nano particles 70 having a larger size.

Further, the method for synthesizing nano particles according to an exemplary embodiment of the present invention can decelerate the moving velocity of the material 40 during the moving process of the material 40 along the cooling path 121 where the nano particles 70 are synthesized. Therefore, the method for synthesizing the nano particles according to the present invention increases the residence time of the material 40 in the cooling path 121, such that the material 40 can be synthesized into the nano particles 70 having a larger size.

The apparatus for synthesizing nano particles according to the present invention includes the cooler that cools material for synthesizing nano particles, wherein the cooler can be constituted to have lower cooling temperatures as going to the moving direction of the material. Therefore, the apparatus for synthesizing nano particles according to the present invention can have a structure where the material is gradually cooled at the time of synthesizing the nano particles to prevent the material from being quickly frozen (quenched), such that the material can be synthesized into nano particles having a larger size.

Further, the apparatus for synthesizing nano particles according to the present invention can have a structure where the moving velocity of the material can be decelerated during the moving of the material along the cooling path where the nano particles are synthesized. Therefore, the apparatus for synthesizing nano particles according to the present invention can have a structure where the probability to synthesize nano particles having a larger size is increased by increasing the residence time of the material in the cooling path.

The method for synthesizing nano particles according to the present invention gradually cools the material during the moving of the material along the cooling path where the nano particles are synthesized, such that the material can be prevented from being quickly frozen. Therefore, the method for synthesizing the nano particles according to the present invention allows the time consuming in synthesizing the material in the cooling path to be sufficient, such that the material can be synthesized into the nano particles having a larger size.

Further, the method for synthesizing the nano particles according to the present invention can decelerate the moving velocity of the material during the moving of the material along the cooling path where the nano particles are synthesized. Therefore, the method for synthesizing nano particles according to the present invention increases the residence time of the material in the cooling path, such that the material can be synthesized into the nano particles having a larger size.

The present invention has been described in connection with what is presently considered to be practical exemplary embodiments. Although the exemplary embodiments of the present invention have been described, the present invention may be also used in various other combinations, modifications and environments. In other words, the present invention may be changed or modified within the range of concept of the invention disclosed in the specification, the range equivalent to the disclosure and/or the range of the technology or knowledge in the field to which the present invention pertains. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments, but, on the contrary, is intended to cover various modifications and equivalent arrangements included within the spirit and scope of the appended claims.

What is claimed is:

1. A method for synthesizing nano particles, comprising:
    moving material in a plasma generating space of a plasma generator in a first direction;
    synthesizing nano particles by cooling the material moved along the first direction through a cooler, wherein
        the synthesizing the nano particles may be performed by cooling the material at temperatures which become lower as the material moves in the first direction, and
        the synthesizing the nano particles includes decelerating the moving velocity of the material by injecting decelerating gas, from a deceleration gas supplier facing opposite to the plasma generator, in a second direction opposite to the first direction, the plasma generator, the cooler, and the deceleration gas supplier being disposed on a same line in a row; and
    recovering the synthesized nano particles into a recovery device after changing the moving direction of the nano particles in a third direction perpendicular to the first direction, the recovery device being disposed at one side of the cooler between the plasma generator and the deceleration gas supplier.

2. The method for synthesizing nano particles according to claim 1, wherein the decelerating the moving velocity of the material is performed by increasing the cross-section of a cooling path where the nano particles are synthesized along the first direction.

3. The method for synthesizing nano particles according to claim 1, wherein the synthesizing the nano particles further includes injecting cooling gas to the inner walls of a cooling path where the nano particles are synthesized along the first direction.

4. A method for synthesizing nano particles, comprising:
    cooling precursors and synthesizing nano particles, while the precursors are moved, in a first direction, in a plasma generator's plasma generating space where a plasma atmosphere is made and through a cooler,
        the cooling the precursors being made at temperatures which become lower as the precursors move in the first direction,
        the forming the nano particles including decelerating the moving velocity of the precursors by injecting inert gas, from a deceleration gas supplier facing opposite to the plasma generator, in a second direction opposite to the first direction, and
        the plasma generator, the cooler, and the deceleration gas supplier being disposed on a same line in a row; and
    recovering the nano particles into a recovery device after changing the moving direction of the nano particles in a third direction perpendicular to the first direction, the recovery device being disposed at one side of the cooler between the plasma generator and the deceleration gas supplier.

5. The method for synthesizing nano particles according to claim 4, wherein the cooling the precursors further includes decelerating the moving velocity of the precursors, wherein the decelerating the moving velocity of the precursors is performed by increasing the cross-section of a cooling path where the nano particles are synthesized along the first direction.

6. The method for synthesizing nano particles according to claim 4, wherein the cooling the precursors is performed by supplying cooling gas having lower temperatures along the first direction to the inside of a cooling path where the nano particles are synthesized.

* * * * *